US009989098B2

(12) United States Patent
Jenkins et al.

(10) Patent No.: US 9,989,098 B2
(45) Date of Patent: Jun. 5, 2018

(54) SYSTEM AND METHOD OF ROTATING ROTOR BLADES FROM A DISTANCE

(71) Applicant: Bell Helicopter Textron Inc., Fort Worth, TX (US)

(72) Inventors: Ricky Jenkins, Bluff City, TN (US); Robert Matson, Bluff City, TN (US); William Sumner, Kingsport, TN (US); Brian Lafon, Johnson City, TN (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days. days.

(21) Appl. No.: 15/440,044

(22) Filed: Feb. 23, 2017

(65) Prior Publication Data

US 2017/0241474 A1     Aug. 24, 2017

Related U.S. Application Data

(60) Provisional application No. 62/299,374, filed on Feb. 24, 2016.

(51) Int. Cl.
| | |
|---|---|
| *B25J 1/04* | (2006.01) |
| *F16C 11/06* | (2006.01) |
| *F16D 1/12* | (2006.01) |
| *B64C 27/50* | (2006.01) |
| *B64C 27/04* | (2006.01) |
| *B64C 27/28* | (2006.01) |

(52) U.S. Cl.
CPC ................... *F16D 1/12* (2013.01); *B25J 1/04* (2013.01); *F16C 11/06* (2013.01); *F16C 11/0619* (2013.01); *B64C 27/04* (2013.01); *B64C 27/28* (2013.01); *B64C 27/50* (2013.01); *F16C 2326/43* (2013.01)

(58) Field of Classification Search
CPC .. A47F 13/06; B25J 1/04; B64C 27/04; B64C 27/28; B64C 27/50; B64F 1/125; B64F 5/50; F16C 11/06; F16C 11/0619; F16C 2326/43; F16D 1/12
USPC .......... 294/22, 191, 209, 210, 211; 244/131, 244/138 A
See application file for complete search history.

(56) References Cited

U.S. PATENT DOCUMENTS

| | | | | |
|---|---|---|---|---|
| 3,133,715 | A * | 5/1964 | Grunfelder | B64C 27/50 244/17.11 |
| 4,301,982 | A * | 11/1981 | Tiemann | B64C 27/50 244/17.11 |
| 4,818,004 | A * | 4/1989 | Oswalt | B66C 1/10 294/67.21 |
| 5,211,538 | A * | 5/1993 | Seghal | B64C 27/50 244/17.11 |
| 6,695,253 | B1 * | 2/2004 | Romani | B64C 27/50 244/17.11 |

(Continued)

*Primary Examiner* — Dean J Kramer
(74) *Attorney, Agent, or Firm* — Timmer Law Group, PLLC

(57) ABSTRACT

In one aspect, there is provided a rotary blade movement system including a retaining member configured to receive a rotor blade, a graspable arm, and a coupling mechanism operable to removably couple the retaining member to the graspable arm. The rotor blade movement system is configured to enable a user to adjust the position of the rotor blade by moving the graspable arm. The coupling mechanism can be a ball and socket joint. In one aspect, there is a method of rotating a rotor blade using a rotary blade movement system.

18 Claims, 7 Drawing Sheets

(56) References Cited

U.S. PATENT DOCUMENTS

| | | | | |
|---|---|---|---|---|
| 6,827,379 B2 * | 12/2004 | Hill | .................. | A47F 5/0006 |
| | | | | 248/205.3 |
| 7,207,519 B2 * | 4/2007 | Hoynash | ................ | B64C 3/56 |
| | | | | 244/17.11 |
| 7,464,974 B2 * | 12/2008 | Oktay | ................. | B60D 1/155 |
| | | | | 16/426 |
| 7,665,969 B2 | 2/2010 | Stamps et al. | | |
| 8,083,276 B2 * | 12/2011 | Schopp | ................. | B25B 9/00 |
| | | | | 29/242 |
| 8,500,059 B2 * | 8/2013 | Beasley | ............... | B25B 9/00 |
| | | | | 244/1 R |
| 9,463,541 B2 | 10/2016 | Sherrill et al. | | |
| 9,532,837 B2 | 1/2017 | Singh et al. | | |
| 9,568,266 B1 | 2/2017 | LoRocco et al. | | |
| 2015/0225077 A1 * | 8/2015 | Dunmire | ........... | B64C 27/006 |
| | | | | 248/316.5 |

* cited by examiner

SYSTEM AND METHOD OF ROTATING ROTOR BLADES FROM A DISTANCE

CROSS-REFERENCE TO RELATED APPLICATION

This patent application claims the benefit of the filing date of U.S. Provisional Patent Application No. 62/299,374, filed Feb. 24, 2016; which is hereby incorporated by reference.

BACKGROUND

Field of the Invention

The present disclosure relates generally to the field of rotorcraft, and more particularly, to a system and a method for rotating rotor blades to a stowed position.

Description of Related Art

Currently to stow rotor blades on a parked rotorcraft maintenance personnel erect a ladder near the blades, climb the ladder, and push or pull the blade as far as the blades can move without falling off the ladder. The maintenance personnel climb down the ladder and move the ladder to repeat the process until the blade is positioned correctly. This time-consuming procedure can be dangerous, unsafe, or cause major damage to the aircraft, especially when conducted in adverse weather conditions, whether from a stationary platform or a ship.

Rotor blades are a critical part of rotary aircraft and extra attention is required to prevent damage to the composite blades that occur when a blade strikes a surface. For example, a blade to blade contact can damage both blades beyond repair.

Accordingly, the need has arisen for a system and method of rotating the rotor blades for use on a rotorcraft that addresses one or more of the foregoing issues.

SUMMARY

In a first aspect, there is provided a rotary blade movement system including a retaining member configured to receive a rotor blade, a graspable arm, and a coupling mechanism operable to removably couple the retaining member to the graspable arm. The rotor blade movement system is configured to enable a user to adjust the position of the rotor blade by moving the graspable arm.

In an embodiment, the retaining member includes a jaw and a hinge, the jaw is configured to rotate about the hinge between an open configuration and a closed configuration.

In another embodiment, the retaining member includes a curved portion shaped to complement a curvature of the rotor blade.

In still another embodiment, the retaining member is a clamp.

In an embodiment, the coupling mechanism includes a ball and socket joint.

In one embodiment, the ball and socket joint includes a socket member and a ball that is received in the socket member.

In another embodiment, the ball is disposed on the retaining member.

In yet another embodiment, the graspable arm includes a pair of arms and a support member attached to the pair of arms, the socket member disposed on the support member.

In an embodiment, the socket member includes a base with a recess to receive the ball in an engaged position, a positional shaft to retain the ball within the recess in the engaged position; and a release member attached to the positional shaft that allows for release of the ball from the recess in a disengaged position.

In one embodiment, the positional shaft includes a spring disposed therein to apply a compressive force to the positional shaft in the engaged position.

In an embodiment, the spring is compressed by the release member in the disengaged position.

In still another embodiment, the release member includes one or more elements selected from the group consisting of: a wire, a cord, a string, a spring, or a cable.

In a second aspect, there is provided a rotary blade movement system including a retaining member configured to receive a rotor blade, the retaining member including a ball disposed thereon; a graspable arm; and a socket member disposed on the graspable arm and operable to removably couple the retaining member to the graspable arm. The rotor blade movement system is configured to enable a user to adjust the position of the rotor blade by moving the graspable arm.

In an embodiment, the graspable arm includes a pair of arms and a support member attached to the pair of arms, the socket member disposed on the support member.

In one embodiment, the socket member includes a base with a recess to receive the ball in an engaged position; a positional shaft to retain the ball within the recess in the engaged position; and a release member attached to the positional shaft that allows for release of the ball from the recess in a disengaged position.

In another embodiment, the positional shaft includes a spring disposed therein to apply a compressive force to the positional shaft in the engaged position.

In still another embodiment, the spring is compressed by the release member in the disengaged position.

In yet another embodiment, the release member includes one or more elements selected from the group consisting of: a wire, a cord, a string, a spring, or a cable.

In a third aspect, there is provided a method of rotating a rotor blade for storage using a rotary blade movement system, the method including removably attaching a retaining member to the rotor blade, the retaining member including a coupling member of a coupling mechanism; grasping an arm having a base of a coupling mechanism by a user; engaging the coupling member with the base so that a coupling mechanism is in an engaged position; and moving the arm to adjust the position of the rotor blade.

In an embodiment, the step of moving the arm to adjust the position of the rotor blade includes rotating the position of the rotor blade to a stowed position.

In another embodiment, the method further includes disengaging the coupling member from the base so the coupling mechanism is in an engaged position.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
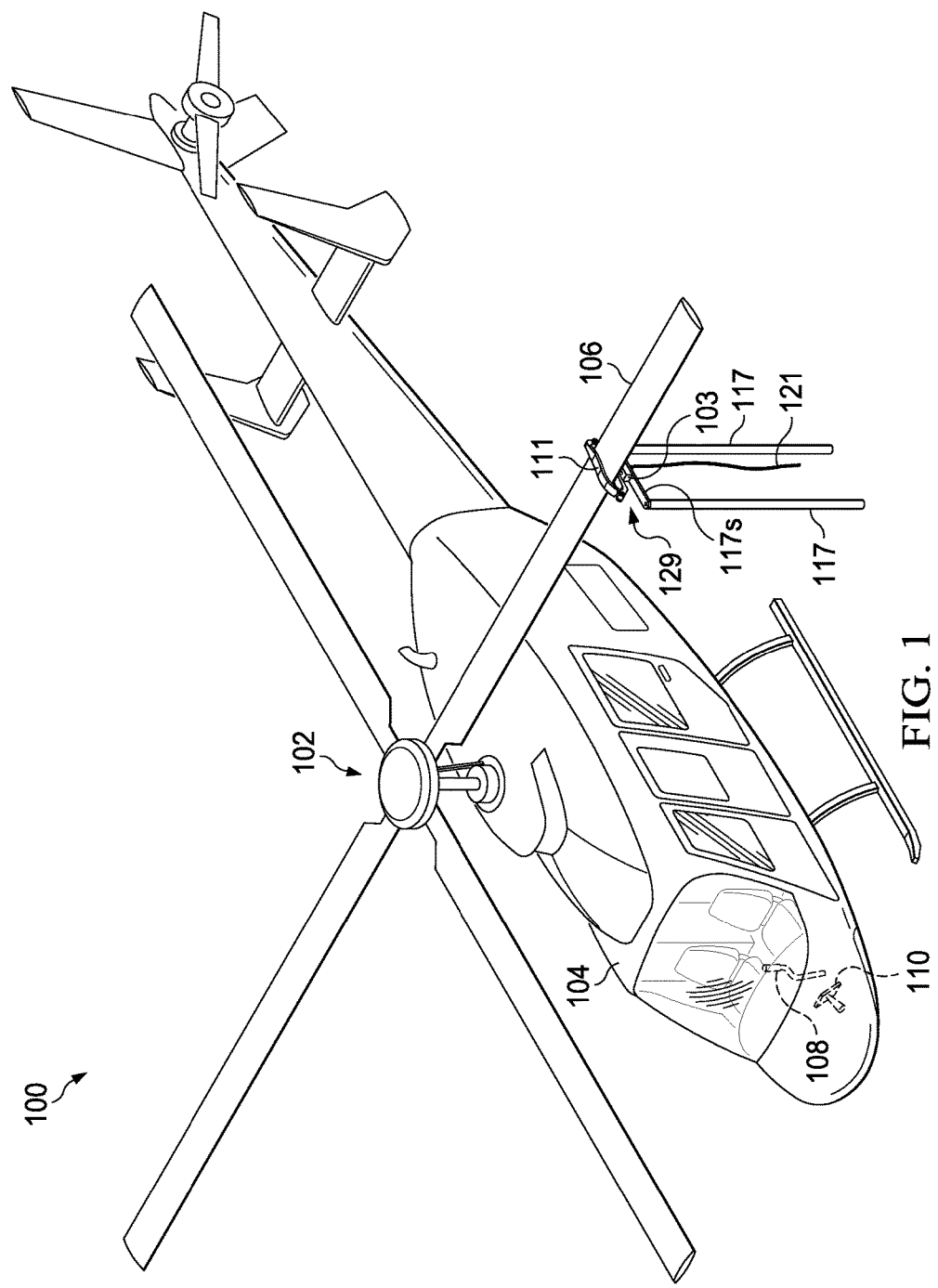
FIG. 1 is a perspective view of a rotary aircraft utilizing a rotary blade movement system, according to an exemplary embodiment.
Figure 2:
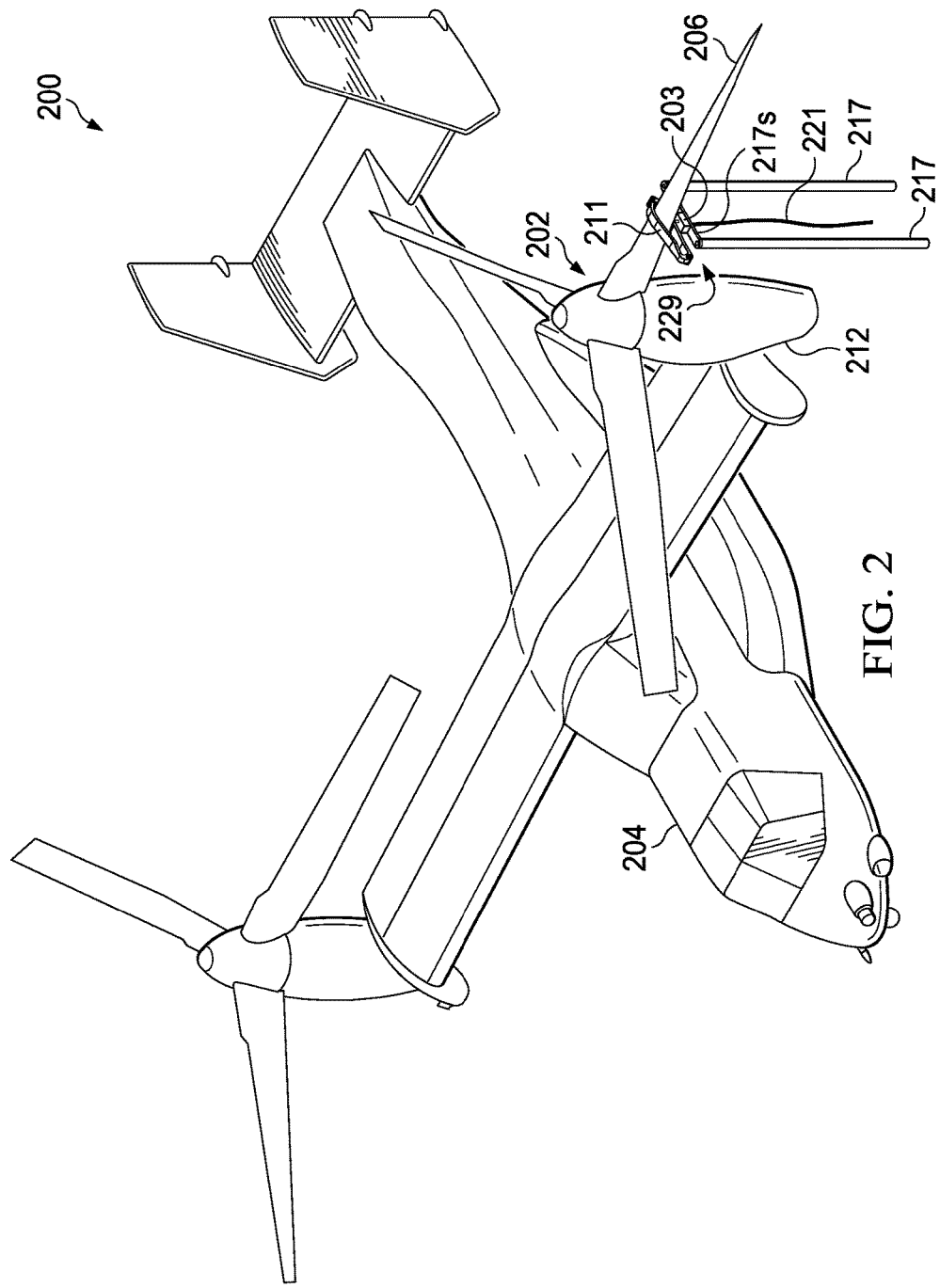
FIG. 2 is a perspective view of a tiltrotor aircraft utilizing the rotor blade movement system, according to an exemplary embodiment.

Referring now to the drawings wherein like reference characters identify corresponding or similar elements throughout the several views, FIGS. 1 and 2 show two different rotary aircraft utilizing exemplary embodiments of rotor blade movement systems. Helicopter 100 includes a rotary system 102 carried by a fuselage 104. One or more rotor blades 106 operably associated with the rotary system 102 provide flight for helicopter 100 and are controlled with a plurality of controllers within the fuselage 104. For example, during flight a pilot can manipulate the cyclic controller 108 for changing the pitch angle of rotor blades 106 and/or manipulate pedals 110, thus providing vertical, horizontal, and yaw flight movement. In order to protect the blades while the aircraft is stored, typically the main rotor blades 106 are rotated to a folded position or stowed in a rack to minimize the footprint of the aircraft. A rotary blade movement system 129 can move or rotate a rotor blade 106 to a folded or stowed position.

The rotary blade movement system 129 can include a retaining member 111 configured to receive the rotor blade 106, a graspable arm 117, and a coupling mechanism 103 operable to removably couple the retaining member 111 to the graspable arm 117. The retaining member 111 can be a clamp that includes a curved portion shaped to complement the curvature of the rotor blade 106. Once the retaining member 111 is mounted to the rotor blade 106, the user moves the arm 117 such that coupling mechanism 103 is in an engaged position and the retaining member 111 is rigidly secured to the arm 117. With the coupling mechanism 103 in the engaged position, a blade pin is removed from the rotary system 102 to permit rotation and movement of the rotor blade 106. The rotor blade movement system 129 is configured to enable a user to adjust the position of the rotor blade by moving or walking with the graspable arm 117 to a desired location.

In an embodiment, the graspable arm 117 can be a pair of arms 117 as shown in FIG. 1. A support member 117s can be a horizontal beam attached to the pair of arms 117. It is contemplated that the graspable arm 117 could come in a variety of shapes, sizes, and configurations. The arm 117 needs to be sufficiently rigid to support the coupling mechanism 103 and have a length sufficient that the user can move the system 129 from the ground. In an embodiment, the support member 117s includes a socket member as a portion of the coupling mechanism 103. In another embodiment, the arm 117 can be an articulating arm.

In certain embodiments, the coupling mechanism 103 is a quick release coupling mechanism that is accessible by the user on the ground. In an embodiment, the coupling mechanism 103 is a ball and socket joint. It should be understood that the coupling mechanism 103 can be other types of spheroidal, sliding, helical, or other planar joints that are configured to releasably and rigidly attach the retaining member 111 and the arms 117. The coupling mechanism 103 can include a ball disposed on the retaining member 111 and a socket member disposed on the support member 117s including a positional shaft to secure the ball in the socket member. However, it is contemplated the coupling mechanism could be in a variety of configurations, e.g., the ball on the support member 117s and the socket member disposed on the retaining member 111 such that the positional shaft extends laterally from the socket member.

The coupling mechanism 103 includes a release member 121 to quickly release from an engaged position to a disengaged position such that a portion of the system is removed from the blade 106, e.g., the socket member can be disengaged or otherwise released from the ball. In an embodiment, the release member 121 is a cord attached to a positional shaft in the socket member. Once the coupling mechanism is disengaged, the retaining member 111 can be removed from the rotor blade 106.

Tiltrotor aircraft 200 includes two or more rotary systems 202 having rotor blades 206 carried by rotatable nacelles 212. The rotatable nacelles 212 provide means for allowing aircraft 200 to take-off and land like a conventional helicopter and for horizontal flight like a conventional fixed wing aircraft. It should be understood that, like helicopter 100, tiltrotor aircraft 200 is provided with controls, e.g., cyclic controllers and pedals, carried within fuselage 204 for controlling movement of the aircraft. In order to protect the blades while the aircraft is stored, typically the main rotor blades are folded to minimize the footprint of the aircraft. Tiltrotor aircraft 200 typically includes a hydraulically driven system for movement of the rotor blades 206 into a stowed position; however, the hydraulic system can occasionally fail. The rotor blade movement system 229 can be oriented to receive rotor blades 206 in a helicopter mode as shown in FIG. 2 with the coupling mechanism 203 positioned on the horizontal support member 217s. In some applications, the rotor blades 206 of the tiltrotor aircraft 200 may be in an airplane mode and positioned forward. In some applications, such as when the rotor blades 206 are positioned forward in airplane mode, the rotary blade movement system 229 can include a socket base mounted vertically to the arm 217.

Figure 3:
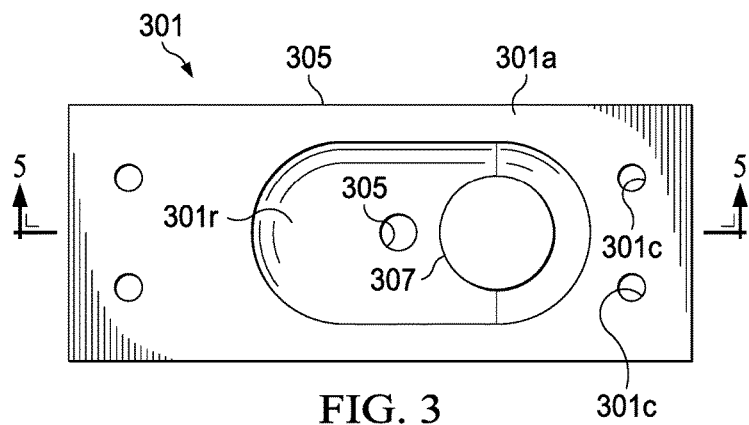
FIG. 3 is a top view of a socket base of a rotor blade movement system, according to an exemplary embodiment.
Figure 4:
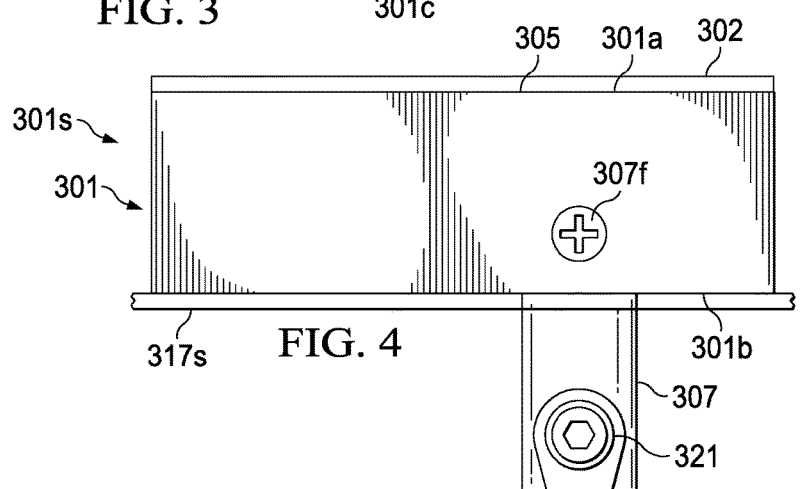
FIG. 4 is a side view of a socket base of the rotor blade movement system, according to an exemplary embodiment.
Figure 5:
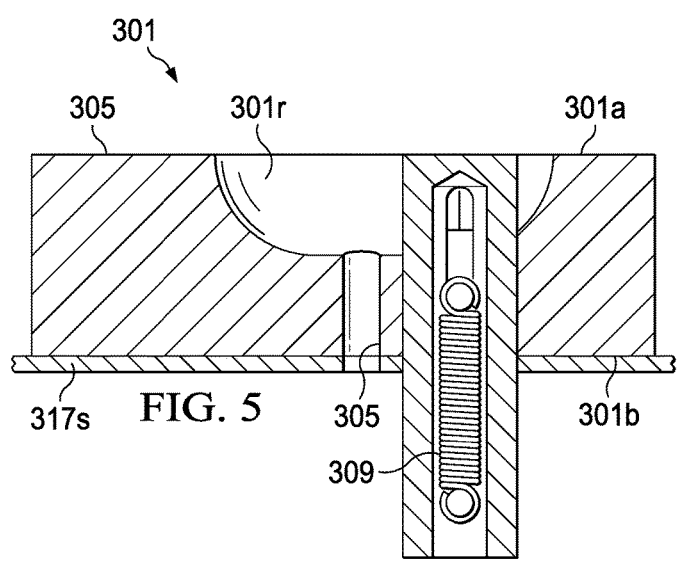
FIG. 5 is a cross-sectional view of the socket base of FIG. 3 taken at 5-5.

Referring now to FIGS. 3-5, various views of a base 301 of a socket member 301s are shown. The base 301 includes a top surface 301a, a recess 301r, a bottom surface 301b, and a channel 305. The base 301 can be made of a machined or molded one piece article or can be constructed of parts. The top surface 301a can be planar and includes a plurality of holes 301c to receive fasteners to secure a plate 302 thereto. The recess 301r is sized to a receive a ball or other type of coupling member therein. The bottom surface 301b can be mounted to the support member 317s. The channel 305 provides an opening from the recess 301r to the bottom surface 301b and can continue as a channel through the support member 317s. The channel 305 can provide a visual indicia that the ball is in the recess 301r and provide an outlet for collection of any fluid in the recess 301r. In an embodiment, the channel 305 can receive an elongated tool such as a screwdriver that can be used to move or adjust the position of the ball in the recess 301r.

The base 301 receives a positional shaft 307 that includes a spring 309, and a release member 321. The positional shaft 307 extends from the recess 301r and to the bottom surface 301b. The positional shaft 307 can be disposed in a portion of the recess 301r. In the embodiment shown in FIGS. 3-5, the positional shaft 307 is located in side portion of the recess 301r where the ball will be received in prior to being in an engaged position. The spring 309 is retained at a first end by a fastener 307f through the positional shaft 307 and retained at an opposite end by the positional shaft 307. The spring 309 pulls the positional shaft 307 toward the top 301a of the base 301 until the positional shaft 307 is pulled down by the release member 321, which depresses the spring 309 therein.

Figure 6A:
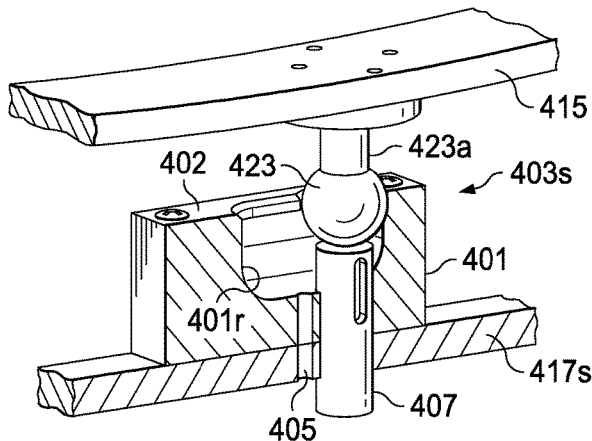
FIG. 6A is a schematic cross-sectional view of the coupling mechanism of a rotor blade movement system as engagement is initiated, according to an exemplary embodiment.
Figure 6B:
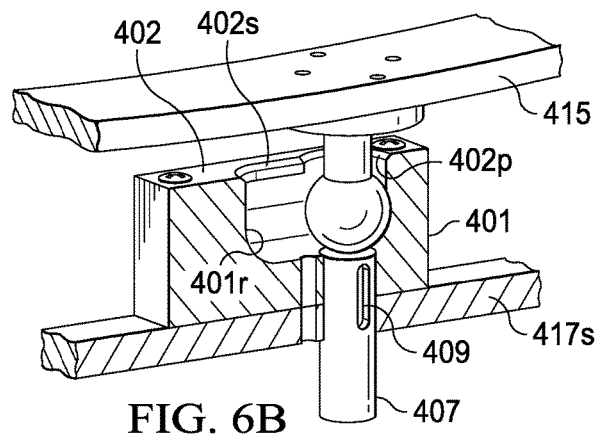
FIG. 6B is a schematic cross-sectional view of the coupling mechanism of a rotor blade movement system while engagement is occurring, according to an exemplary embodiment.
Figure 6C:
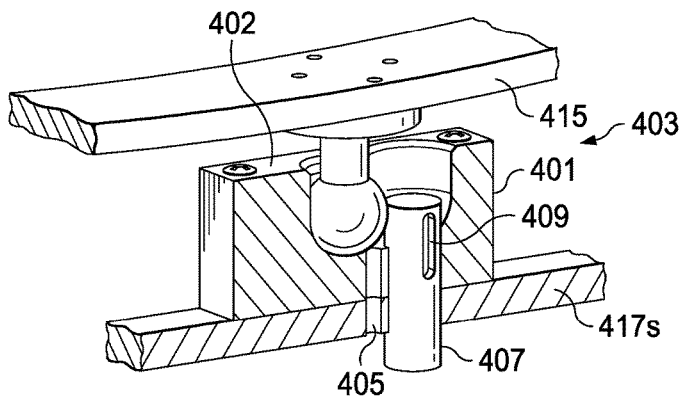
FIG. 6C is a schematic cross-sectional view of the coupling mechanism of a rotor blade movement system while engaged, according to an exemplary embodiment.

Referring to FIGS. 6A-6C, an embodiment of the coupling mechanism 403 is shown in the various steps to achieve the engaged position. The coupling mechanism 403 includes a downwardly facing ball 423 disposed on a first jaw member 415. In other embodiments, the ball 423 is a coupling member having a semi-sphere, cubic, hexagonal, cylindrical or other suitable shape for mating with a base 401. The socket member 403s is formed of the base 401 and a plate 402 fastened thereto to cover a portion of the recess 401r. The plate 402 includes an opening 402p to receive the ball 423 therethrough and a slit 402s to receive the arm 423a when the ball 423 is in the engaged position as shown in FIG. 6C. As shown in FIG. 6A, the ball 423 on the first jaw member 415 clamped to a rotor blade enters through the opening 402 and partially depresses the positional shaft 407 to allow the ball 423 to translate along a depth of the recess 401r. As shown in FIG. 6B, the positional shaft 407 is entirely depressed to allow the ball 423 to enter the recess 401r and translate along the length of the recess 401r. As shown in FIG. 6C, the positional shaft 407 is extended upward and the ball 423 is retained in a portion of the recess 401r adjacent to the positional shaft 407. In an embodiment, the positional shaft 407 can be pulled down by the hand of the user to disengage the ball 423 from the recess 401r so as to permit the ball 423 to move lengthwise and upward in the recess 401r.

Figure 7:
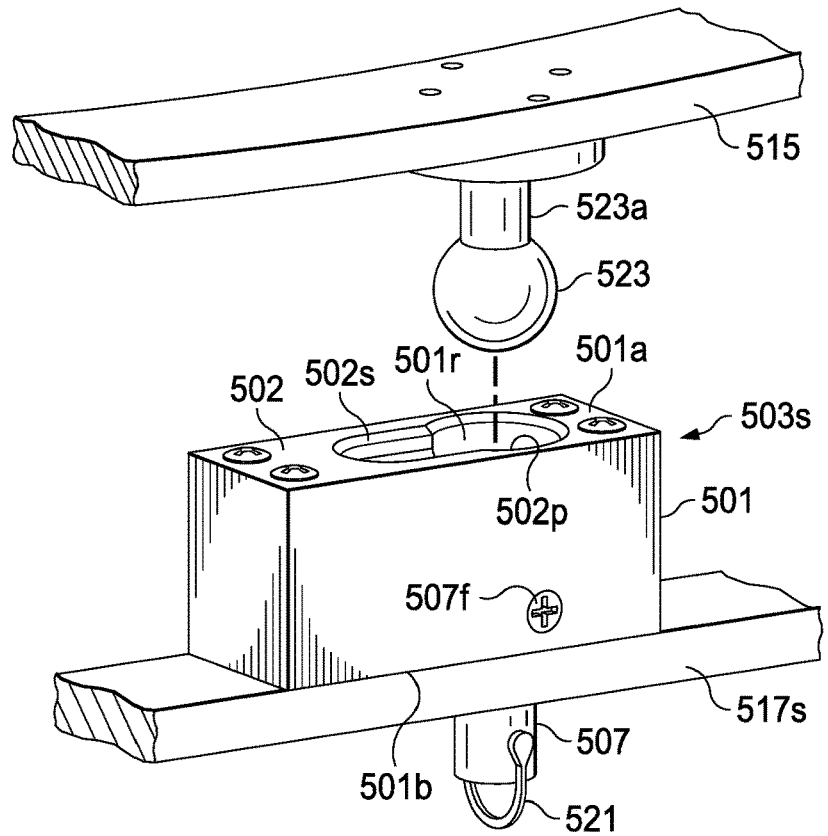
FIG. 7 is an oblique view of a coupling mechanism of a rotor blade movement system before engagement, according to an exemplary embodiment.
Figure 8:
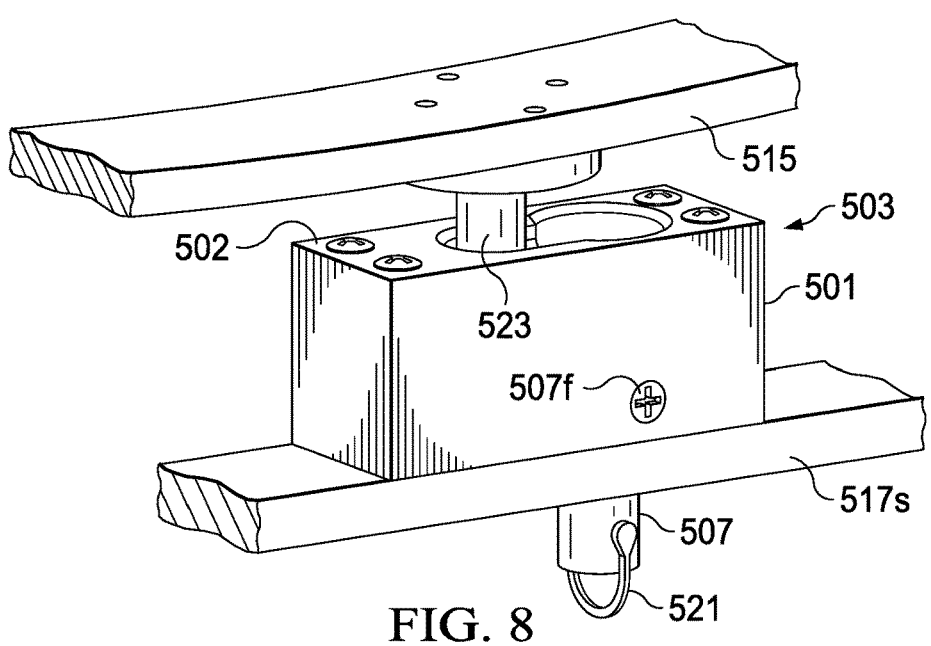
FIG. 8 is an oblique view of a coupling mechanism when engaged, according to an exemplary embodiment.

Referring to FIGS. 7-8, various views of the coupling mechanism 503 are shown. The positional shaft 507 includes a release member 521 that is a pivoting handle that can be attached to a hook on a pole, a wire, a cord, a string, a spring, a cable, or combinations thereof for quick release of the coupling mechanism 503 that is accessible by a user from the ground. The ball socket 523 in the coupling mechanism 503 in FIG. 7 is shown in a disengaged position. FIG. 8 shows the ball socket 523 in the coupling mechanism 503 in the engaged position and retained therein by the positional shaft 507.

Figure 9:
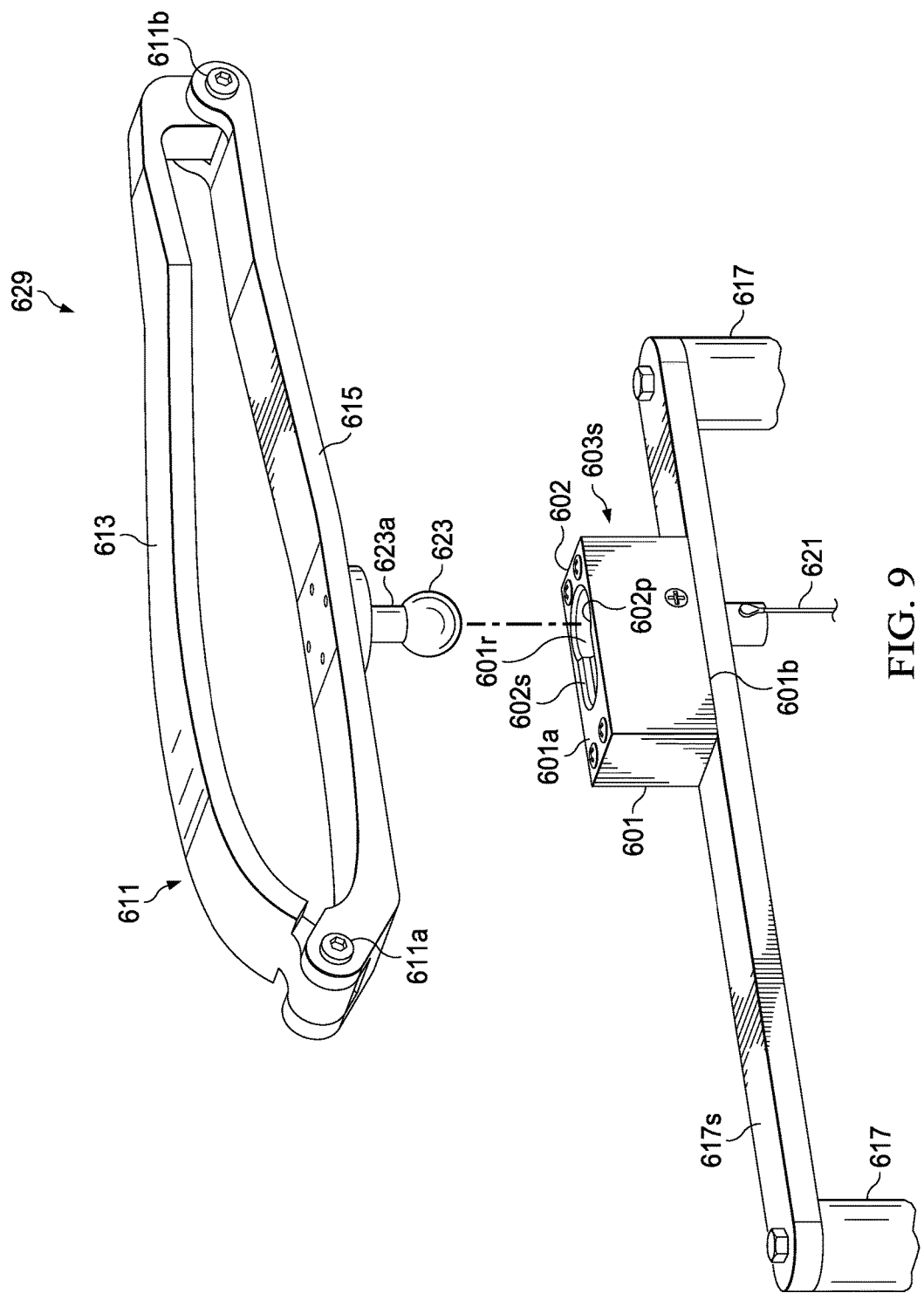
FIG. 9 is an oblique view of a rotor blade movement system before engagement, according to an exemplary embodiment.
Figure 10:
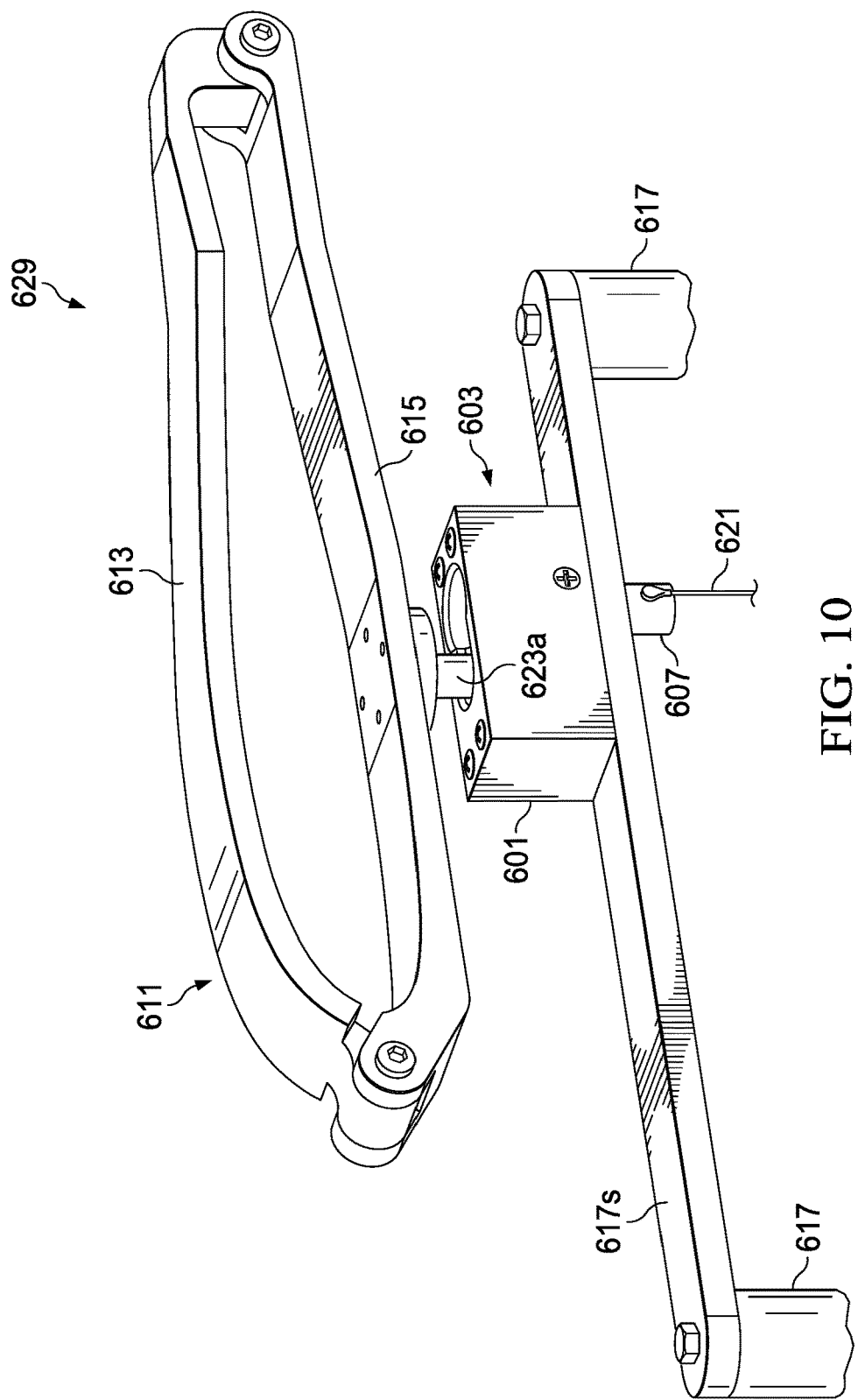
FIG. 10 is an oblique view of a rotor blade movement system when engaged, according to an exemplary embodiment.

Referring now to FIGS. 9-10, various views of the rotary blade movement system 629 are shown. The retaining member 611 includes a jaw comprised of a first jaw member 613 and a second jaw member 615. The retaining member includes a first hinge 611a and a locking hinge 611b. The first jaw member 613 or the second jaw member 615 can rotate about the first hinge 611a to receive the outer surface of the rotor blade therein and are securely locked at locking hinge 611b during use. The first and second jaw members 613, 615 can have a curved portion shaped to complement a curvature of the rotor blade. The second jaw member 615 is rigidly fixedly to the ball 623 of the coupling mechanism 603. Therefore, a user can move the rotor blade up and down and side to side by moving the ball 623 so long as retaining member 611 is secured to the blade.

The coupling mechanism 603 is shown attached to the retaining member 611 and the graspable arms 617. The socket member 603s includes the base 601, the plate 602, the positional shaft 607, and a release member 621. The socket member 603s is located on the support member 617s disposed between the two arms 617.

In an embodiment, there is a method of rotating a rotor blade for storage using the rotor blade movement system 629 including removably attaching the retaining member 611 to the rotor blade. The user then grasps at least one arm 617 having the coupling mechanism 603 thereon and moves the arm 617 so that the ball 623 is received in the opening 602p and into an engaged position in base 601 of the socket member 603s as shown in FIG. 10. A blade pin can be removed at the hub of the rotary system to permit the rotor blade to rotate therefrom. The user then walks or otherwise moves the arms 617 to adjust the position of the rotor blade. In an embodiment, the step includes rotating the rotor blade to a stowed position. In a further step, the ball 623 is disengaged from the recess 601r by pulling on the release member 621, which pulls the positional shaft 607 downward to permit the ball 623 to translate lengthwise through and out of the recess 601r.

The rotary blade movement system can provide many advantageous over conventional rotary blade movement systems: users do not need to repeatedly climb up and down a ladder to move a blade; the release member provides a quick release that is accessible from the ground; blades can be secured entirely through the process by holding onto the arms of the system; and blades can be secured into frames configured to secure multiple ball sockets.

At least one embodiment is disclosed and variations, combinations, and/or modifications of the embodiment(s) and/or features of the embodiment(s) made by a person having ordinary skill in the art is within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A rotor blade movement system comprising:
   a retaining member configured to receive a rotor blade;
   a graspable arm, the graspable arm comprises a pair of arms and a support member attached to the pair of arms; and
   a coupling mechanism operable to removably couple the retaining member to the graspable arm, the coupling mechanism comprising a ball and socket joint, the ball and socket joint including a socket member and a ball that is received in the socket member the socket member disposed on the support member;
   wherein the rotor blade movement system is configured to enable a user to adjust the position of the rotor blade by moving the graspable arm.

2. The rotor blade movement system according to claim 1, wherein the retaining member comprises a jaw and a hinge, the jaw is configured to rotate about the hinge between an open configuration and a closed configuration.

3. The rotor blade movement system according to claim 1, wherein the retaining member comprises a curved portion shaped to complement a curvature of the rotor blade.

4. The rotor blade movement system according to claim 1, wherein the retaining member is a clamp.

5. The rotor blade movement system according to claim 1, wherein the ball is disposed on the retaining member.

6. A rotor blade movement system comprising:
   a retaining member configured to receive a rotor blade;
   a graspable arm; and
   a coupling mechanism operable to removably couple the retaining member to the graspable arm, the coupling mechanism comprising a ball and socket joint, the ball and socket joint including a socket member and a ball that is received in the socket member, the socket member comprises:
   a base with a recess to receive the ball in an engaged position;
   a positional shaft to retain the ball within the recess in the engaged position; and
   a release member attached to the positional shaft that allows for release of the ball from the recess in a disengaged position;
   wherein the rotor blade movement system is configured to enable a user to adjust the position of the rotor blade by moving the graspable arm.

7. The rotor blade movement system according to claim 6, wherein the positional shaft comprises a spring disposed in the positional shaft to apply a compressive force to the positional shaft in the engaged position.

8. The rotor blade movement system according to claim 7, wherein the spring is compressed by the release member in the disengaged position.

9. The rotor blade movement system according to claim 6, wherein the release member comprises one or more elements selected from the group consisting of: a wire, a cord, a string, a spring, or a cable.

10. A rotor blade movement system comprising:
    a retaining member configured to receive a rotor blade, the retaining member including a ball disposed thereon;
    a graspable arm, the graspable arm comprises a pair of arms and a support member attached to the pair of arms; and
    a socket member disposed on the support member and operable to removably couple the retaining member to the graspable arm;
    wherein the rotor blade movement system is configured to enable a user to adjust the position of the rotor blade by moving the graspable arm.

11. A rotor blade movement system comprising:
    a retaining member configured to receive a rotor blade, the retaining member including a ball disposed thereon;
    a graspable arm; and
    a socket member disposed on the graspable arm and operable to removably couple the retaining member to the graspable arm, the socket member comprises:
    a base with a recess to receive the ball in an engaged position;
    a positional shaft to retain the ball within the recess in the engaged position; and
    a release member attached to the positional shaft that allows for release of the ball from the recess in a disengaged position;

wherein the rotor blade movement system is configured to enable a user to adjust the position of the rotor blade by moving the graspable arm.

12. The rotor blade movement system according to claim 11, wherein the positional shaft comprises a spring disposed in the positional shaft to apply a compressive force to the positional shaft in the engaged position.

13. The rotor blade movement system according to claim 12, wherein the spring is compressed by the release member in the disengaged position.

14. The rotor blade movement system according to claim 11, wherein the release member comprises one or more elements selected from the group consisting of: a wire, a cord, a string, a spring, or a cable.

15. A method of rotating a rotor blade for storage using a rotor blade movement system, the method comprising:
   removably attaching a retaining member to the rotor blade, the retaining member including a ball of a coupling mechanism, the coupling mechanism comprising a ball and socket joint, the ball and socket joint including a socket member that receives the ball therein;
   grasping a pair of arms having a support member with the socket member of a coupling mechanism by a user;
   engaging the ball with the socket member so that the coupling mechanism is in an engaged position; and
   moving the pair of arms to adjust the position of the rotor blade.

16. The method according to claim 15, wherein the step of moving the pair of arms to adjust the position of the rotor blade comprises rotating the position of the rotor blade to a stowed position.

17. The method according to claim 15, wherein the socket member comprises:
   a base with a recess to receive the ball in an engaged position;
   a positional shaft to retain the ball within the recess in the engaged position; and
   a release member attached to the positional shaft that allows for release of the ball from the recess;
   the method further comprising disengaging the ball from the socket member by releasing the release member so the coupling mechanism is in a disengaged position.

18. A method of rotating a rotor blade for storage using a rotor blade movement system, the method comprising:
   removably attaching a retaining member to the rotor blade, the retaining member including a ball of a coupling mechanism, the coupling mechanism comprising a ball and socket joint, the ball and socket joint including a socket member for receiving the ball therein, the socket member comprises:
   a base with a recess to receive the ball in an engaged position;
   a positional shaft to retain the ball within the recess in the engaged position; and
   a release member attached to the positional shaft that allows for release of the ball from the recess;
   grasping an arm having a support member with the socket member of the coupling mechanism by a user;
   engaging the ball with the socket member so that the coupling mechanism is in the engaged position; and
   moving the arm to adjust the position of the rotor blade.

* * * * *